United States Patent
Kumar et al.

(10) Patent No.: US 7,630,512 B2
(45) Date of Patent: Dec. 8, 2009

(54) METHOD FOR PERFORMING RECOVERABLE VIDEO AND IMAGE WATERMARKING WHICH SURVIVES BLOCK-BASED VIDEO AND IMAGE COMPRESSION

(75) Inventors: Senthil Kumar, Marlboro, NJ (US); James William McGowan, Whitehouse Station, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 924 days.

(21) Appl. No.: 11/138,941

(22) Filed: May 26, 2005

(65) Prior Publication Data

US 2006/0269096 A1 Nov. 30, 2006

(51) Int. Cl.
*G06K 9/00* (2006.01)
*H04L 9/32* (2006.01)

(52) U.S. Cl. ........................ 382/100; 713/176
(58) Field of Classification Search ................. 382/100, 382/232–233; 380/201, 210, 217; 358/3.28; 375/240.2, 240.24, 240.25; 713/176; 348/207.99
See application file for complete search history.

(56) References Cited

U.S. PATENT DOCUMENTS

| | | | |
|---|---|---|---|
| 6,778,678 B1 | 8/2004 | Podilchuk et al. | 382/100 |
| 7,127,065 B1* | 10/2006 | Depovere et al. | 380/201 |
| 7,409,556 B2* | 8/2008 | Wu et al. | 713/176 |
| 2004/0136562 A1* | 7/2004 | Sarraf et al. | 382/100 |
| 2004/0136563 A1* | 7/2004 | Sarraf et al. | 382/100 |
| 2005/0069167 A1 | 3/2005 | Zarrabizadeh | 382/100 |
| 2005/0069168 A1 | 3/2005 | Zarrabizadeh | 382/100 |
| 2005/0069169 A1 | 3/2005 | Zarrabizadeh | 382/100 |
| 2005/0220321 A1* | 10/2005 | Langelaar | 382/100 |
| 2006/0133644 A1* | 6/2006 | Wells et al. | 382/100 |

* cited by examiner

*Primary Examiner*—Kanji Patel
(74) *Attorney, Agent, or Firm*—Kenneth M. Brown

(57) ABSTRACT

A method for performing recoverable image and video watermarking which survives the use of block-based image and video compression techniques. One or more of the lowest order bits of the first DCT coefficient (the "DC" coefficient) which is to be coded are used as a "data channel" by which information representing a recoverable watermark may be embedded into an image or into a video signal frame. Encoding is performed by replacing one or more low order bits of the luminance value of each pixel in a block with a number of bits of the watermark data, and decoding is performed by averaging one or more low order bits of the decoded luminance values of the pixels in a block to retrieve a corresponding number of bits of the watermark data.

20 Claims, 2 Drawing Sheets

METHOD FOR PERFORMING RECOVERABLE VIDEO AND IMAGE WATERMARKING WHICH SURVIVES BLOCK-BASED VIDEO AND IMAGE COMPRESSION

FIELD OF THE INVENTION

The present invention relates generally to the field of digital watermarking technologies and more particularly to a method for performing recoverable image and video watermarking which survives the use of block-based image and video compression techniques.

BACKGROUND OF THE INVENTION

Watermarking is the process of embedding information into a given object or signal, such as, for example, an image or a video signal, preferably in such a manner that the embedded information is imperceptibly added to the given signal. That is, although the resultant signal appears to the casual viewer as being unmodified (as compared to the original signal), it in fact contains embedded information which can be recovered if and when desired.

Generally, video and image digital watermarking technologies fall into two categories. The most common form of digital watermarking is known as indelible marking, in which a typical user cannot remove the watermark. This form of watermarking is often used, for example, to provide copyright protection for proprietary videos or images. The second form of digital watermarking is known as recoverable watermarking. Recoverable watermarking is a method of embedding information in an image or video signal, usually with the goal of recording some useful information to accompany the image or the video. With recoverable watermarking techniques, a user would be able to defeat (e.g., remove) the watermark, but would presumably want the information and would not do so. This type of watermarking may be used to embed useful additional data into the signal, such as, for example, information about a product being advertised in a video commercial. For example, when such a commercial airs, the version of the commercial and specific products (such as, for example, sale items at a grocery store) can be easily recovered.

Another example of useful data to be embedded (i.e., watermarked) into a video signal with the use of a recoverable watermark might be the date and time that each video frame (i.e., individual video image) of the recording was captured, possibly as well as information which identifies the particular recording device (i.e., a camera) which was used. In this manner, each frame of the resultant video can be uniquely identified by a decoder of the video signal. And since a given recording device only records one video at a time, this approach results in a unique identification of each frame recorded in any number of videos. Similarly, for an image (e.g., a digital photograph), it may be desirable to watermark the image with the date and time that the image was captured (e.g., when the photograph was taken), which may be used for archival purposes.

One limitation with current methodologies for performing video (as well as image) watermarking is that they do not survive typical video (or image) compression techniques—that is, the compression process destroys the watermark. For example, since most video signals are compressed with use of a video compression algorithm such as, for example, MPEG-2, MPEG-4, H.263 or H.264, this puts severe constraints on who can add the watermark, and where in the video transmission network such watermarking can be done. (MPEG-2, MPEG-4, H.263 and H.264 are all video compression standards, each of which is fully familiar to those of ordinary skill in the art.) And technologies that require compression to the home, such as, for example, satellite TV or video-over-DSL, cannot, therefore, use the current technology.

SUMMARY OF THE INVENTION

In accordance with the principles of the present invention, a method is provided for performing recoverable image and video watermarking which survives the use of typical block-based image and video compression techniques. In particular, note that most image and video compression technology standards in use today are block-based and that they explicitly retain overall luminance information about each block. In each of these standards, blocks of pixels having widths and heights equal to either 8 or 16 pixels are compressed, often with use of a discrete cosine transformation (DCT). (The discrete cosine transformation is a well-known frequency transform fully familiar to those of ordinary skill in the art.) The first coefficient of the DCT represents the overall luminance of the block. Although early video coding methods quantized (i.e., compressed the representation of) this coefficient, often leaving pictures with a "blocky" appearance, the video coding methods used today (e.g., MPEG-2, MPEG-4, H.263 and H.264) either maintain this coefficient at full resolution, or, at most, quantize this coefficient with the removal of only the lowest order bit, thereby eliminating the "blocky" appearance of earlier techniques.

We have recognized that the approach taken by these current methods is a conservative one, and that, in fact, a small number (e.g., up to 3) of the low order bits can typically be removed from this coefficient without the introduction of visible artifacts, particularly in the case of video signals. Therefore, in accordance with the principles of the present invention, one or more of the lowest order bits of the first DCT coefficient which is to be coded may be advantageously used as a "data channel" by which information representing a recoverable watermark may be advantageously embedded into an image or into a frame of a video signal. Since the codec (i.e., coder/decoder system) faithfully reproduces this luminance value (at least through all but possibly one low order bit) through the encoding and decoding process, the embedded information remains unmodified, and can therefore advantageously survive multiple trans-codings (i.e., successive codings and decodings).

More specifically, in accordance with one illustrative embodiment of the present invention, a method for encoding a watermark into an image signal advantageously replaces one or more low order bits of the luminance value of each pixel in a block with a number of bits of the watermark data. Moreover, in accordance with another illustrative embodiment of the present invention, a method for decoding a watermark (which has been encoded into an image signal in accordance with an illustrative embodiment of the present invention) is advantageously performed by averaging one or more low order bits of the decoded luminance values of the pixels in a block to retrieve a corresponding number of bits of the watermark data.

DETAILED DESCRIPTION OF THE ILLUSTRATIVE EMBODIMENTS

Figure 1:
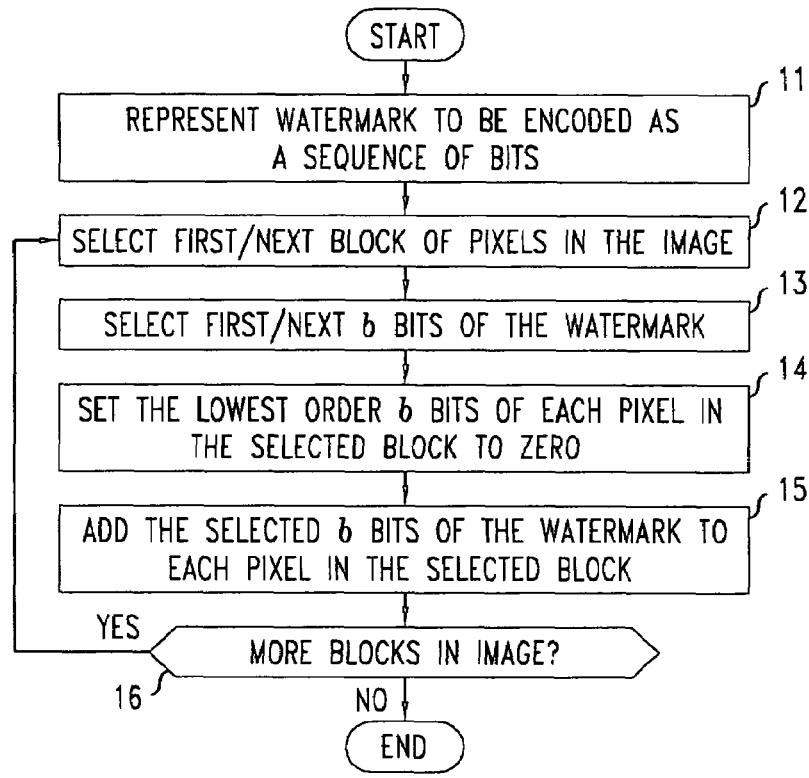
FIG. 1 shows the operation of an illustrative method for encoding a recoverable watermark in an image or video signal in accordance with an illustrative embodiment of the present invention, such that the encoded watermark survives the use of block-based image/video compression techniques.

Suppose that a video camera could watermark frames of a movie. On a 640 pixel by 480 pixel resolution shot, there are (640/16)*(480/16)=1200 blocks per frame, assuming that the blocks are 16 pixels by 16 pixels. If just a single bit is used per block, this allows 1200 bits (e.g., 150 bytes) of watermark information that can be encoded on a single frame. Note, for example, that this is a sufficient bit rate for uniquely marking every frame from a particular distributor. For example, the ISO 8601 standard, which is fully familiar to those of ordinary skill in the art, defines a date and time format that fully specifies time from a four digit year to fractions of a second in 25 bytes. (Although the 25 bytes specified by the ISO 8601 standard format could easily be reduced without loss of information, when the information is simply represented as a standard ASCII text string it requires 25 bytes.) By assigning a MAC (Media Access Controller) address to the device, 12 bytes could be used to uniquely identify the camera. (MAC addresses are also fully familiar to those of ordinary skill in the art.) Therefore, with 37 bytes or less, the image of each video frame can be uniquely identified. Given the availability of 150 bytes of watermarking information, this would leave a substantial number of additional bytes of information to allow for user-supplied information, history marking, robustness to resizing, or any number of other useful pieces of information.

Note that a digital image can be described as a set of c "color" planes. Typically, c=1 for a black-and-white picture, and c=3 for a color picture. In the former case the image is typically a rectangular M by N grid of pixels. (Note that one can consider the visual depiction of an image as a rectangle without being concerned with the actual layout of the image data in physical memory.) The data for each pixel of the image comprises a number of bits which holds a value representing an intensity level. In the color (i.e., c=3) case, the planes are usually either (i) R (red), G (green) and B (blue), which are typically all the same size, namely M by N; or (ii) Y (achromatic color, or brightness), U (chromatic color) and V (chromatic color), with Y having a size M by N, and each of U and V having the same size which is either M by N, M by N/2 or M/2 by N/2.

In accordance with certain illustrative embodiments of the present invention, each plane in a digital image may be advantageously considered to be an independent image that can be separately watermarked. That is, one of these planes may be watermarked with given data or multiple ones of these planes may be individually watermarked with separate sets of data. In accordance with other illustrative embodiments of the present invention, data to be embedded as a watermark may be spread amongst the various planes of the image. If, illustratively, only one plane of a color image represented with R, G and B planes is watermarked in accordance with an illustrative embodiment of the present invention, it is preferable to use the G (green) plane if the image may get subsequently converted to a Y, U and V plane representation.

Note that essentially all commonly employed video compression standards are block-based. As is well known to those of ordinary skill in the art, block-based codecs segment an M by N color plane into sub-picture "blocks" of various rectangular sizes ranging from 8 pixels by 8 pixels to 16 pixels by 16 pixels. In accordance with various illustrative embodiments of the present invention, any block size equal to or larger than the largest block used in compression may be employed. In accordance with the illustrative embodiment of the present invention described in detail below, we will treat all images as being divided into 16 pixel by 16 pixel blocks, as this gives the most general solution.

More specifically, these video compression schemes (e.g., MPEG-2, MPEG-4, H.263 and H.264) encode individual blocks of a video frame by applying a Discrete Cosine Transformation (DCT) to the pixel data in each block, to generate a sequence of DCT coefficients. (The DCT is a well known frequency transform which is fully familiar to those of ordinary skill in the art.) The first coefficient of the DCT is known as the "DC" value, which represents the average brightness of the block and is typically stored as an 8 bit value. Although all of the other DCT coefficients generated for the block are quantized by these video compression schemes, this DC value is typically either left unmodified (i.e., uncompressed) or is quantized from 8 bits to 7 bits (e.g., compressed by eliminating only the one lowest order bit). Note that excessive quantization of the DC value has been shown to result in "blocky" artifacts, such as those which occurred in compression schemes prior to MPEG-2 (as a result of such excessive quantization of the DC value).

In accordance with the principles of the present invention, however, it has been recognized that the lack of or minimal quantization performed on the DC value by these currently employed video compression schemes is, in fact, somewhat conservative. Thus, in accordance with an illustrative embodiment of the present invention, 1 or 2 bits of the DC value are advantageously (further) quantized with little or no visible difference in quality. These bits are then, in accordance with the illustrative embodiment of the present invention, advantageously used as a separate channel of information to embed a watermark into the video signal.

FIG. 1 shows the operation of an illustrative method for encoding a recoverable watermark in an image or video signal in accordance with an illustrative embodiment of the present invention, such that the encoded watermark survives the use of block-based image/video compression techniques. In this illustrative embodiment of the present invention it is assumed that the image (or the video frame) to be watermarked is advantageously divided into 16 pixel by 16 pixels blocks and that the "DC" coefficient of the DCT of each block is not quantized (i.e., coded uncompressed). It is also assumed in accordance with this illustrative embodiment of the present invention that the message (i.e., watermark) to be encoded can be represented in at most a number of bits that is fewer than the number of blocks in the image divided by the number of bits, b, to be encoded in each block. (See below.)

Specifically, in accordance with this illustrative embodiment of the present invention, the encoding of the watermark proceeds as follows. First, as shown in box 11 of the flowchart, a message to be encoded (i.e., embedded into the image as a watermark) is represented as a series of bits. Then, the next (or the first, if this is the first iteration of the flowchart) 16 by 16 block of pixels in the image is selected, as shown in box 12 of the flowchart. Then, the next (or the first, if this is the first iteration of the flowchart) b bits from the message are selected, as shown in box 13 of the flowchart. As shown in box 14 of the flowchart, for each pixel in the selected block, each of the b lowest order pixels are set to 0, for a predetermined value of b. Illustratively, b may be one, two or three, depending on how "conservative" one wishes to be in the accurate encoding of the "DC" coefficients.

Then, as shown in box 15 of the flowchart, the (same) b bits selected from the message are added to each pixel in the selected block. (Note that, illustratively, when the bits of the message have been depleted, the remaining blocks of the image may advantageously assume that all message bits are, for example, zero.) Finally, as shown by decision box 16 of the flowchart, flow returns to box 12 of the flowchart if there are more blocks in the image. Note that in accordance with various illustrative embodiments of the present invention, blocks may be assigned in any order, although preferably, a left-to-right, top-to-bottom coding order is the most natural to use since this is the order most typically used in conventional codecs (i.e., encoder/decoder systems).

Figure 2:
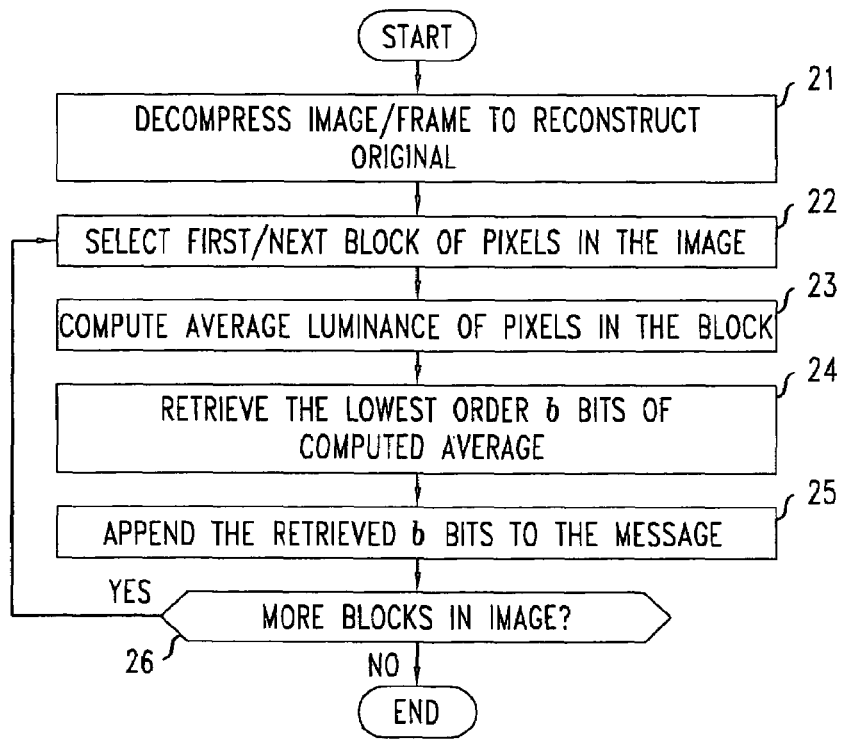
FIG. 2 shows the operation of an illustrative method for decoding a recoverable watermark from an image or video signal which has been encoded with use of the illustrative encoding method of FIG. 1 in accordance with another illustrative embodiment of the present invention.

FIG. 2 shows the operation of an illustrative method for decoding a recoverable watermark from an image or video signal which has been encoded with use of the illustrative encoding method of FIG. 1 in accordance with an illustrative embodiment of the present invention. First, if the image or video has been compressed, decompression must be applied to reconstruct the original image or video frame, as shown in box 21 of the flowchart. Then, each 16 by 16 block of pixels is selected in turn, as shown in box 22 of the flowchart.

Within the selected block, the overall luminance is calculated by taking the average over all pixels in the block, as shown in box 23 of the flowchart. Note that, in accordance with the illustrative embodiment of the present invention used to encode the watermark, the lowest b bits of this average value are advantageously the next b bits of the message. Thus, as shown in box 24 of the flowchart, the lowest order b bits of this computed average value is retrieved from the average, and, as shown in box 25 of the flowchart, these b bits are added (i.e., appended) to the message (i.e., the watermark) being retrieved. Finally, as shown in decision box 26 of the flowchart, flow returns to box 22 of the flowchart if there are more blocks in the image. Note that the collection of all these bits over all the blocks of the image, assembled in order, form the original message (i.e., the watermark).

Note that, in accordance with certain illustrative embodiments of the present invention, it is possible to retrieve the watermark without completely decoding the image, since the average value computed in the above-described process in accordance with the illustrative embodiment shown in FIG. 2 is precisely the "DC" value stored as the first coefficient of the DCT of the block. Thus, one could advantageously decode the watermark in, for example, intermediate network components in a video transmission system. Thus, in accordance with one illustrative embodiment of the present invention, a content provider could mark frames, and a local content distributor (e.g., a cable or satellite television provider) could then advantageously use the watermark to verify that an intermediate distributor is providing the correct feed.

Figure 3:
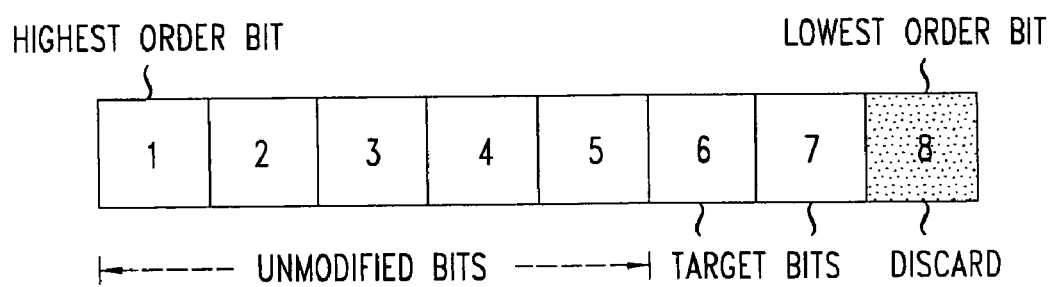
FIG. 3 shows an illustrative 8 bit representation of a DCT coefficient (or, equivalently, a luminance value of a pixel) to be used to embed watermarking information in accordance with one illustrative embodiment of the present invention.

FIG. 3 shows an illustrative 8 bit representation of a DCT coefficient (or, equivalently, a luminance value of a pixel) to be used to embed watermarking information in accordance with one illustrative embodiment of the present invention. As pointed out above, some compression schemes sacrifice the lowest bit of each pixel by quantizing the "DC" luminance value by one bit to achieve slightly better compression. In accordance with one illustrative embodiment of the present invention, the use of such compression schemes may be advantageously incorporated in the instant watermarking process by ignoring the very lowest luminance bit, and using the next b highest bits only, as shown in FIG. 3. Illustratively, FIG. 3 shows using 2 bits—the second and third lowest order bits, labeled in the figure as bits 6 and 7—when the lowest order bit (labeled in the figure as bit 8) is removed by the quantization process of the compression scheme. Note that, as compared to the illustrative embodiment of the present invention shown in FIGS. 1 and 2 and described above, this simply reduces the number of bits that can be used to encode the message to be embedded (i.e., the watermark) by 1 bit per block.

Addendum to the Detailed Description

It should be noted that all of the preceding discussion merely illustrates the general principles of the invention. It will be appreciated that those skilled in the art will be able to devise various other arrangements, which, although not explicitly described or shown herein, embody the principles of the invention, and are included within its spirit and scope. In addition, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. It is also intended that such equivalents include both currently known equivalents as well as equivalents developed in the future— i.e., any elements developed that perform the same function, regardless of structure.

We claim:

1. A method for encoding a watermark into an image signal, the image signal representative of an image comprising a plurality of blocks, each of said blocks comprising a plurality of pixels, each pixel having a corresponding luminance value associated therewith, the method performed by a computer and comprising the steps of:

generating, with use of the computer, a representation of the watermark comprising a sequence of bits;

selecting, with use of the computer, one of said blocks of said image;

selecting, with use of the computer, a predetermined number, b, of bits from said sequence of bits comprised in said watermark, where b is greater than or equal to one; and replacing, with use of the computer, a corresponding set of b bits of the luminance value associated with at least one of said pixels comprised in said selected block of said image with said b bits selected from said sequence of bits comprised in said watermark.

2. The method of claim 1 wherein said image signal comprises a frame of a video signal.

3. The method of claim 1 further comprising the step of performing, with use of the computer, a block-based compression scheme on said image signal.

4. The method of claim 1 wherein said step of replacing said corresponding set of b bits of the luminance value associated with said at least one of said pixels comprised in said selected block of said image with said b bits selected from said sequence of bits comprised in said watermark comprises replacing a corresponding set of b bits of the luminance value associated with each of said pixels comprised in said selected block of said image with said b bits selected from said sequence of bits comprised in said watermark.

5. The method of claim 1 wherein said corresponding set of b bits of the luminance value associated with said at least one of said pixels comprised in said selected block of said image which are replaced comprises a consecutive sequence of b bits of the luminance value associated with said at least one of said pixels comprised in said selected block of said image which includes a lowest order bit of the luminance value associated with said at least one of said pixels comprised in said selected block of said image.

6. The method of claim 1 wherein said corresponding set of b bits of the luminance value associated with said at least one of said pixels comprised in said selected block of said image which are replaced comprises a consecutive sequence of b bits of the luminance value associated with said at least one of said pixels comprised in said selected block of said image which does not include a lowest order bit of the luminance value associated with said at least one of said pixels comprised in said selected block of said image and which does include a next to lowest order bit of the luminance value associated with said at least one of said pixels comprised in said selected block of said image.

7. The method of claim 1 wherein each of said steps of
selecting one of said blocks of said image,
selecting a predetermined number, b, of bits from said sequence of bits comprised in said watermark, and
replacing a corresponding set of b bits of the luminance value associated with at least one of said pixels comprised in said selected block of said image with said b bits selected from said sequence of bits comprised in said watermark,
are repeated a plurality of times, wherein
said repetitions of said step of selecting one of said blocks of said image selects different, successive blocks of said image,
said repetitions of said step of selecting a predetermined number, b, of said sequence of bits comprised in said watermark selects different, successive subsequences of bits comprised in said watermark, and
said repetitions of said step of replacing a corresponding set of b bits of the luminance value associated with at least one of said pixels comprised in said selected block of said image with said b bits selected from said sequence of bits comprised in said watermark replaces said corresponding set of b bits of the luminance value associated with at least one of said pixels comprised in said different, successive blocks of said image with said b bits selected from said different, successive subsequences of bits comprised in said watermark.

8. The method of claim 7 wherein said repetitions of said steps of
selecting one of said blocks of said image,
selecting a predetermined number, b, of bits from said sequence of bits comprised in said watermark, and
replacing a corresponding set of b bits of the luminance value associated with at least one of said pixels comprised in said selected black of said image with said b bits selected from said sequence of bits comprised in said watermark,
continue until each of the bits from said sequence of bits comprised in said watermark have been selected.

9. The method of claim 1 wherein said watermark is representative of at least a date and a time of creation of said image.

10. The method of claim 1 wherein said watermark is representative of at least a device which was used in the creation of said image.

11. A method of decoding a watermark which has been encoded into an image signal, the image signal representative of an image comprising a plurality of blocks, each of said blocks comprising a plurality of pixels, each pixel having a corresponding luminance value associated therewith, the method performed by a computer and comprising the steps of:
selecting, with use of the computer, one of said blocks of said image;
computing, with use of the computer, a block luminance value of said selected block based on one or more values associated with one or more of said pixels comprised in said selected block of said image;
retrieving, with use of the computer, a predetermined number, b, of bits from said block luminance value of said selected block, where b is greater than or equal to one; and
determining, with use of the computer, at least a part of said watermark based on said b bits retrieved from said block luminance value of said selected block.

12. The method of claim 11 wherein said image signal comprises a frame of a video signal.

13. The method of claim 11 further comprising the step of generating, with use of the computer, said image signal by performing a block-based decompression scheme on an encoded image signal.

14. The method of claim 11 wherein said step of computing the block luminance value of said selected block comprises computing an average of said luminance values of each of said pixels comprised in said selected block of said image.

15. The method of claim 11 wherein the step of retrieving b bits from said block luminance value of said selected block comprises retrieving a consecutive sequence of b bits of said block luminance value of said selected block which includes a lowest order bit of said block luminance value of said selected block.

16. The method of claim 11 wherein the step of retrieving b bits from said block luminance value of said selected block comprises retrieving a consecutive sequence of b bits of said block luminance value of said selected block which does not include a lowest order bit of said block luminance value of said selected block and which does include a next to lowest order bit of said block luminance value of said selected block.

17. The method of claim 11 wherein each of said steps of
selecting one of said blocks of said image,
computing a block luminance value based on one or more values associated with one or more of said pixels comprised in said selected block of said image, and
retrieving a predetermined number, b, of bits from said block luminance value of said selected block,
are repeated a plurality of times, wherein
said repetitions of said step of selecting one of said blocks of said image select different, successive blocks of said image,
said repetitions of said step of computing said block luminance value based on one or more values associated with one or more of said pixels comprised in said selected block of said image compute block luminance values based on one or more values associated with one or more of said pixels comprised in said different, successive selected blocks of said image, and
said repetitions of said step of retrieving b bits from said block luminance value of said selected block retrieve b bits from said block luminance values of said different, successive selected blocks of said image.

18. The method of claim 17 wherein said repetitions of said steps of
- selecting one of said blocks of said image,
- computing a block luminance value based on one or more values associated with one or more of said pixels comprised in said selected block of said image, and
- retrieving a predetermined number, b, of bits from said block luminance value of said selected block, continue until each of the bits comprised in said watermark have been retrieved.

19. The method of claim 11 wherein said watermark is representative of at least a date and a time of creation of said image.

20. The method of claim 11 wherein said watermark is representative of at least a device which was used in the creation of said image.

* * * * *

UNITED STATES PATENT AND TRADEMARK OFFICE
CERTIFICATE OF CORRECTION

PATENT NO.         : 7,630,512 B2
APPLICATION NO.    : 11/138941
DATED              : December 8, 2009
INVENTOR(S)        : Kumar et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1231 days.

Signed and Sealed this

Twenty-first Day of December, 2010

David J. Kappos
*Director of the United States Patent and Trademark Office*